US011154930B2

(12) United States Patent
Ruch et al.

(10) Patent No.: US 11,154,930 B2
(45) Date of Patent: Oct. 26, 2021

(54) METHOD FOR PRODUCING A POROUS SHAPED BODY

(71) Applicant: Mahle International GmbH, Stuttgart (DE)

(72) Inventors: Roland Ruch, Schopfheim (DE); Roland Scholl, Laufenburg (DE); Patrick Sutter, Schopfheim (DE); Klaus Wintrich, Schopfheim (DE)

(73) Assignee: Mahle International GmbH

(*) Notice: Subject to any disclaimer, the term of this patent is extended or adjusted under 35 U.S.C. 154(b) by 942 days.

(21) Appl. No.: 15/373,190

(22) Filed: Dec. 8, 2016

(65) Prior Publication Data
US 2017/0157672 A1    Jun. 8, 2017

(30) Foreign Application Priority Data
Dec. 8, 2015  (DE) ............... 10 2015 224 588.8

(51) Int. Cl.
| | | |
|---|---|---|
| *B22F 3/11* | (2006.01) | |
| *B22F 3/10* | (2006.01) | |
| *C04B 35/626* | (2006.01) | |
| *C22C 38/16* | (2006.01) | |
| *C04B 35/64* | (2006.01) | |
| *B22F 3/00* | (2021.01) | |
| *B22F 5/00* | (2006.01) | |
| *C04B 35/63* | (2006.01) | |
| *B22F 1/00* | (2006.01) | |
| *C04B 35/638* | (2006.01) | |
| *C04B 35/632* | (2006.01) | |
| *F02F 3/00* | (2006.01) | |

(52) U.S. Cl.
CPC .......... *B22F 3/1143* (2013.01); *B22F 1/0059* (2013.01); *B22F 3/004* (2013.01); *B22F 3/1007* (2013.01); *B22F 3/1021* (2013.01); *B22F 3/1121* (2013.01); *C04B 35/626* (2013.01); *C04B 35/63* (2013.01); *C04B 35/632* (2013.01); *C04B 35/638* (2013.01); *C04B 35/64* (2013.01); *C22C 38/16* (2013.01); *B22F 5/008* (2013.01); *B22F 2001/0066* (2013.01); *B22F 2301/10* (2013.01); *B22F 2301/35* (2013.01); *B22F 2302/40* (2013.01); *B22F 2998/10* (2013.01); *C04B 2235/602* (2013.01); *F02F 3/0084* (2013.01)

(58) Field of Classification Search
CPC ...... B22F 3/004; B22F 3/1021; B22F 3/1143; B22F 3/1007; B22F 3/1121; B22F 1/0059; B22F 2001/0066; B22F 2301/10; B22F 2301/35; B22F 2302/40; B22F 5/008; B22F 2998/10; C04B 2235/602; C04B 35/626; C04B 35/63; C04B 35/632; C04B 35/638; C04B 35/64; C22C 38/16; F02F 3/0084
See application file for complete search history.

(56) References Cited

U.S. PATENT DOCUMENTS

| | | | | | |
|---|---|---|---|---|---|
| 4,483,820 | A | * | 11/1984 | Schelb | ...................... B22F 3/10 164/15 |
| 4,942,217 | A | * | 7/1990 | Gardziella | ............ B22C 1/2253 525/480 |
| 5,258,151 | A | | 11/1993 | Bayer et al. | |
| 5,360,049 | A | * | 11/1994 | Rowe | ...................... B22C 7/065 164/16 |
| 2002/0058136 | A1 | | 5/2002 | Belhadjhamida | |
| 2005/0249625 | A1 | * | 11/2005 | Bram | .................... B22F 3/1121 419/2 |
| 2008/0171218 | A1 | | 7/2008 | Naumann et al. | |
| 2016/0175927 | A1 | | 6/2016 | Rotmann et al. | |

FOREIGN PATENT DOCUMENTS

| | | |
|---|---|---|
| CN | 1275456 A | 12/2000 |
| CN | 1863630 A | 11/2006 |
| DE | 123500 A3 | 1/1977 |
| DE | 3004209 A1 | 8/1981 |
| DE | 29611969 U1 | 11/1996 |
| DE | 69505566 T2 | 7/1999 |
| DE | 102004014076 B3 | 12/2005 |
| DE | 202009004082 U1 | 7/2009 |
| DE | 10 2012 020 829 A1 | 4/2014 |
| DE | 10 2013 215 020 A1 | 2/2015 |
| EP | 0517129 A2 | 12/1992 |
| JP | S56-123302 A | 9/1981 |
| JP | S61-067703 A | 4/1986 |
| WO | 2013/013015 A2 | 1/2013 |

OTHER PUBLICATIONS

European Search Report dated Apr. 11, 2017 for EP Application No. 16202499.6.
Anonymous: "Grundlagen der GieBereitechnik", Jan. 1, 2005, URL:https://web-beta.archive.org/web/20140801211956/http://www.vdg.de/fileadmin/content/03_documents/Grundlagen_der_Giessereitechnik_1.pdf.
English abstract for DE-69505566.
German Search Report for DE-102015224588.8, dated Aug. 10, 2016.

(Continued)

*Primary Examiner* — Anthony M Liang
(74) *Attorney, Agent, or Firm* — Fishman Stewart PLLC

(57) ABSTRACT

A method for producing a porous shaped body may include providing a mixture of a powder including at least one of a metal, a metal alloy, and a ceramic, with a resin/activator mixture. The method may then include introducing the mixture by core shooting into a cavity formed in a forming tool, and solidifying the mixture in the forming tool to give a shaped body. The method may then include heating the shaped body to remove at least one of organic constituents and gases present in the shaped body. The method may further include resolidifying the shaped body by a sintering operation.

15 Claims, 1 Drawing Sheet

(56) References Cited

OTHER PUBLICATIONS

European Office Action dated Sep. 25, 2019 for European Application 16202499.6.
Chinese Office Action dated Aug. 30, 2019 for Chinese Application 201611107599.4.
Werner Schatt: "Kap. 5—Aufbereitung der Pulver" in "Pulvermetallurgie: Technologien und Werkstoffe", Nov. 28, 2006 (Nov. 28, 2006), Springer Verlag, Berlin [u.a.], XP055590665, ISBN: 978-3-540-23652-8, Seiten 49-69.
Werner Schatt: "Kap. 13—Hochpropose Werkstoffe und Filter" in "Pulvermetallurgie: Technologien und Werkstoffe", Nov. 28, 2006 (Nov. 28, 2006), Springer Verlag, Berlin [u.a.], XP055590663, ISBN: 978-3-540-23652-8, Seiten 371-396.
English abstract for CN1863630.
Japan Office Action dated Sep. 23, 2020 for copending Japenese Patent Appl. No. JP 2016-234900 (with English translation).
Chinese Office Action dated May 10, 2021 for copending Chinese Appl. No. 201611107599.4.

\* cited by examiner

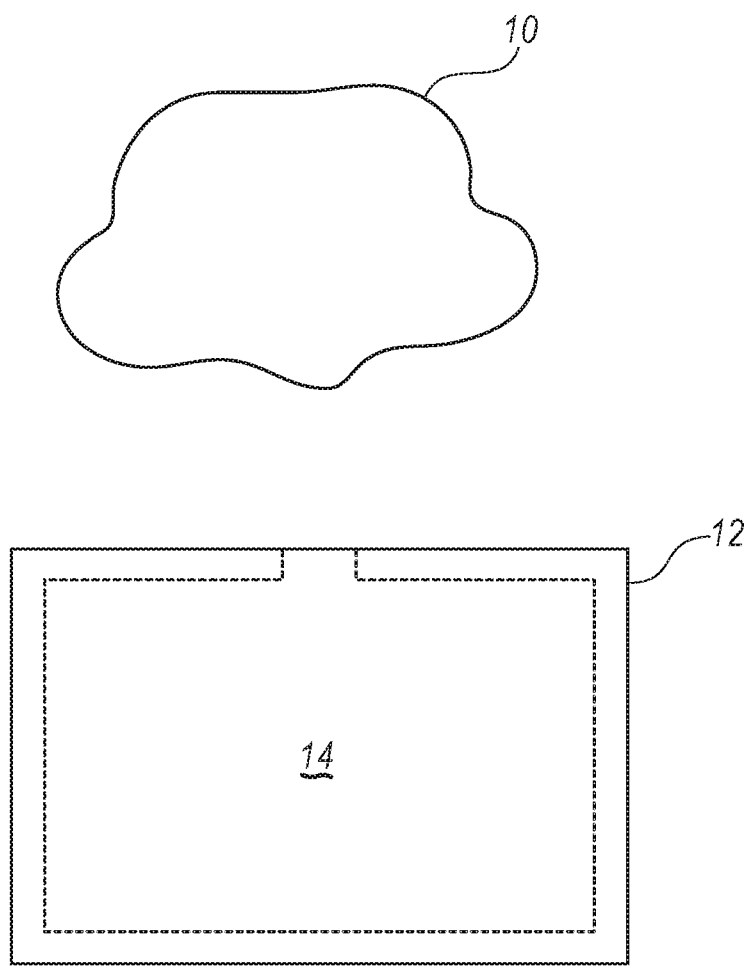

METHOD FOR PRODUCING A POROUS SHAPED BODY

CROSS-REFERENCE TO RELATED APPLICATIONS

This application claims priority to German Patent Application No. DE 10 2015 224 588.8, filed on Dec. 8, 2015, the contents of which are hereby incorporated by reference in its entirety.

TECHNICAL FIELD

The invention relates to a method for producing a porous shaped body.

BACKGROUND

At the heart of the concerns when developing a new engine or even when engine downsizing, as well as increasing the power concentration, is an extension to the lifetime of the engines whilst at the same time reducing the emissions and hence the fuel consumption. The demands imposed on the individual motor components in order to achieve these objectives, in terms of durability, high-temperature integrity and wear resistance, are often more exacting than before. One example is the modification of materials in order to reduce the wear on the inside of the cylinder, reducing the friction between piston rings and cylinder running surfaces. The system present is ultimately a complex system of individual components interacting tribologically with one another, such as piston ring/cylinder wall and piston ring/cylinder, for instance.

In combustion engines, moving masses are to be minimized for reasons of energy efficiency: firstly, in view of the need for them to be continually accelerated and braked, they use up part of the engine power, so entering into the energy balance of the engine on the negative side, and secondly, by their mass, they impose a greater load on other components, such as mounting parts, for example. In view of this it is obvious to develop the construction of the moving components in such a way that they have a minimal mass. One way of achieving this is to use materials of low density, for example Al alloys. This group of materials, however, is known to possess low hardness, high thermal conductivity, restricted service temperature on account of their melting characteristics, a relatively low strength, and low wear resistance in contact with other materials, such as steels, for example. Nevertheless, Al alloys have an important part to play in the development and realization of new engine designs, not least as materials for pistons of internal combustion engines.

Because of increasing power densities and harsher operating conditions (e.g. combustion pressures in the cylinder) affecting internal combustion engines, critical operating states arise, and are reflected in increased wear and shorter life of certain components. Hence it is necessary to ensure that the piston grooves are not prematurely worn by the increased loads, and do not thereby impair the "sealing" characteristics and hence the overall efficiency of the engine.

One method which is known from the prior art, and which is employed with Al pistons in order to reduce the wear between piston ring and piston, is the casting-in of cast rings made from nickel-resist cast iron materials. Casting-in, however, is not without its problems, since the piston ring carriers require pretreatment before casting in order to achieve effective connection to the Al piston. Nevertheless, the interface between the Al alloy and the Ni-resist piston ring carrier is critical in service, since the transition from the Al material to the cast component is abrupt, and temperature gradients result in thermally induced stresses, which can give rise to damage. Moreover, the materials in question have a density of around 7.4 g/cm$^3$, which increases the mass of the Al piston when constructed with the same dimensions.

For the purpose of reducing component density, the prior art discloses production of porous components having particularly low component density. Porous components with a particularly high porosity and with consequently low component density are produced, according to DE 202009004082 U1, as part of the production of honeycomb bodies. The starting point there is a metal foam composed of pure metals—for example iron, nickel, chromium, copper or aluminium—which are processed to form alloys resistant to oxidation and to corrosion. The details of production are described in DE 102004014076 B3. Metal foam bodies with an open-pore structure are formed from an open-pore structure composed of a pure metal by application of a powder coat and sintering, the composition of the material being modified in such a way that it requires particular oxidation and corrosion properties. Porous components produced in this way attain a porosity of around 90%.

DE 10 2012 020 829 A1 describes a method for producing sintered porous components. By using a powder mixture composed of a spherical or regular component and a platelet-shaped component it is possible to tailor the porosity in a component. Modified mixtures lead to different tap densities and bulk densities, which in sintered products result in different pore types and pore contents. Through an appropriate combination of the at least two components it is possible—independently of the material and/or its material density—to attain bulk densities on green bodies of 20% to 70% TD (TD: ratio of component density to density of the material in %, corresponding to theoretical material density). In the sintered component, as a result, relative densities of 30% to 80% TD are attained. Powder mixtures of this kind can be processed by known methods of powder technology, such as compression moulding, film casting, injection moulding.

DE 10 2013 215 020 A1 describes an insert component for cast Al pistons of internal combustion engines, this component being amenable to infiltration, meaning that it has an open porosity. The starting point there is a mixture of iron-based powders whose individual particles are particularly coarse. Claimed specifically is a mixture in which not more than 4 mass % of the particles have an average diameter of 75 μm. Further disclosed is the use of a binder as a coating for the powder particles, in particular with a resin, which is said to lead to sufficient green strength in the mouldings and that burns off again during sintering. An insert component manufactured in accordance with the invention is said to attain, after sintering, a density of 2.5 to 4.7 g/cm$^3$ and/or a porosity of 80 to 50 vol % or about 32% to 60% TD.

SUMMARY

It is an object of the present invention to show new ways of developing methods for producing porous shaped bodies.

This object is achieved by the subject matter of the independent claims. Preferred embodiments are subject matter of the dependent claims.

The fundamental concept of the invention, accordingly, is to form a porous shaped body from a mixture composed of a metal, ceramic and/or alloy powder and of a resin/activator system by means of core shooting, in other words by a fluid-dynamic operation. Through an appropriate composition of the mixture and appropriate selection of the resin/activator system, the method of the invention can be used for producing media-permeable functional components which can be adapted to particular applications.

In a first step a) of the method of the invention presented here for producing a porous shaped body 10, a powder composed of a metal and/or metal alloy and/or ceramic is mixed with a resin/activator mixture. The resulting mixture must be sinterable. This means that a thermal treatment produces a fusional connection between adjacent particles. In a second step b), the mixture is introduced by core shooting into a cavity 14 designed in a forming tool 12. In a third step c), the mixture in the forming tool is solidified to a shaped body by the action of a reactive substance, e.g. a gas. In a fourth step d), the shaped body is warmed or heated in order to remove organic constituents present in the shaped body and/or gas present in the shaped body. In a fifth step e), finally, the shaped body is sintered and so solidified.

The above-described method allows porous shaped bodies to be produced with almost infinite geometric shaping. The method can therefore be utilized for producing any of a very wide variety of components, which find use, in particular, in vehicle construction. It is conceivable, for example, for cylinder liners or components of filter means to be produced. In view of the relatively low fluid pressure acting on the mixture and/or the shaped body, by comparison with other methods, such as compression moulding or injection moulding, for instance, components can be produced that have a complex geometric structure and also large external dimensions.

Another advantage of the method of the invention is that the composition of the homogeneous mixture in step a) can be varied almost infinitely without incidences of powder separation, which lead often to changes in the material. For instance, metals can be mixed with alloys and with ceramics. Furthermore, when using a metal powder, connections can be produced, during the sintering in step e), only at the contact surfaces, without any areal connection. In this way a shaped body of particularly high porosity can be produced.

Also conceivable, therefore, is the production of a shaped body from particles having a specific particle morphology, possessing a mixture of large platelets and small spheres. In this system, during sintering, the small spheres move to the contact faces of the larger platelets, with the effect first—owing to the larger surface area of the small spheres—of a better connection between the platelets, and secondly a larger void in the region from which the spheres, so to speak, "migrate away".

It is also conceivable for a second component to be provided in the homogeneous mixture, this component evaporating on warming/heating according to step d), thus forming an additional void and hence a deliberate porosity. Examples contemplated for a second component of this kind include paraffin particles or polyethylene particles, which go into the gas phase on heating.

In one preferred embodiment, the resin/activator mixture provided in step a) has between 0.5 wt % and 5 wt % of the overall weight of the mixture. This allows the desired porosity to be set over a wide range without any accompanying unwanted diminishment in the strength of the shaped body formed.

The introducing in step b) usefully takes place fluid-dynamically using a pressurized gas.

A particularly useful gas pressure to which the pressurized gas is subject, for introducing the mixture into the forming tool, is a pressure between 10 bar and 100 bar.

With particular preference, the pressurized gas is compressed air or nitrogen or argon or comprises compressed air and/or nitrogen and/or argon. By means of such "fluidization" it is possible to produce a shaped body having the desired high porosity.

The solidifying in step c) takes place preferably by introduction of at least one reactive gas into the forming tool. The reactive gas initiates a chemical reaction whose result is that the powder enters into a bond with the resin of the resin/activator in the cavity. In one variant the solidifying may also take place by the shaped body being left in the forming tool—thus without introduction of a reactive gas—for a predetermined period. With this variant, however, the formation of the said bond takes place more slowly than in the case of the variant with reactive gas.

With particular preference the reactive gas may comprise amide or be amide.

Experimental investigations have shown that a particularly good connection can be produced between the powder and the resin/activator mixture when amide is used as reactive gas.

With particular preference the shaped body in step d) is warmed/heated to a temperature between 25° C. and 700° C. Warming/heating the shaped body to a temperature within the stated temperature range is a particularly effective way of removing the said organic constituents and/or gases.

In a further preferred embodiment, the warming/heating takes place in a neutral, oxidizing or reducing atmosphere. In this way, unwanted chemical reactions on the shaped body during outgassing can be avoided.

In another preferred embodiment, the sintering operation in step e) takes place in a reducing, carbonizing or neutral atmosphere. In this way it is possible to achieve a flexural strength for the shaped body of between 5 MPa and 1000 MPa, the shaped body having an overall porosity of between 20% and 80%.

In a further advantageous development, during the solidifying in step c) or after the solidifying according to step c), no mechanical pressure is exerted on the shaped body as it forms. In this way, a high porosity can be ensured for the shaped body.

The invention further relates to a porous shaped body produced by means of the method as elucidated above.

In one preferred embodiment, the shaped body is designed as a component of a filter means or as a cylinder liner.

It would be appreciated that the features identified above and those still to be elucidated hereinafter can be used not only in the specific combination indicated but also in other combinations or else alone, without departing from the scope of the present invention. Preferred working examples of the invention are elucidated in more detail in the description hereinafter.

BRIEF DESCRIPTION OF THE DRAWING

The FIGURE illustrates a schematic forming tool having a cavity used to produce a porous shaped body.

DETAILED DESCRIPTION

The method of the invention is discussed below with reference to a first example. In step a) a metallic starting powder is selected which permits in particular the desired functional properties in the end product, such as pore size and mechanical strength, for example.

The two metal powder mixtures SAMPLE A and SAMPLE B as per Table AB1.1 meet these criteria.

TABLE AB1.1

Composition of the metal mixture [AB1]

|  | Iron powder [AB5] (150-425 μm) | Copper powder (45-250 μm) | Graphite: |
|---|---|---|---|
| SAMPLE A | balance | 3 wt % | 0 wt % |
| SAMPLE B | balance | 3 wt % | 0.65 wt % |

The two metal powder mixtures of Tab. AB1.1 are then each mixed in step a) with a resin/activator mixture. The mixtures are subsequently shot by core shooting, in each case with different shooting pressures—e.g. 4, 6, 8 and 10 bar—according to step b), into a cavity having external dimensions of 180×24×24 mm³ and thereafter cured in a step c) under the action of a reactive gas—in the example scenario, the reactive gas "DMPA 706"—for 10 seconds.

The resulting shaped bodies possess a density of 3.5 g/cm³ and a 3-point flexural strength of 1.4 MPa (SAMPLE A) and 1.9 MPa (SAMPLE B). Higher pressures may lead to moulding defects on the shaped body; low levels of resin/activator diminish the flexural strength and edge resistance. Higher levels of resin and/or activator are detrimental to the demouldability of the shaped body.

In a thermal operation referred to as preliminary sintering, the resin is removed from the shaped body according to step d) by heating of the shaped body at a rate of 2 K/min to 700° C. in an $N_2$—$H_2$ atmosphere. Solidification—measured in the form of flexural strength—takes place in step e) by heating from 700° C. at 5 K/min to the sintering temperature $T_{sinter}$ under the $N_2$—$H_2$ atmosphere. For SAMPLE A, there is only a slight increase in flexural strength (see Tab. AB1.3). The graphite-containing powder mixture (SAMPLE B) attains a much higher strength, with a maximum value of around 9 MPa.

Tab. AB1.3 shows the results of sintering.

| $T_{sinter}$ | 4.1 (SAMPLE A) | 4.2 (SAMPLE B) |
|---|---|---|
| 1115 | 4.7 | 7.4 |
| 1120 | 4.7 | 6.99 |
| 1135 | 4.6 | 7.98 |
| 1145 | 4.5 | 8.6 |
| 1175 | 4.9 | 9.02 |

Tab. AB1.3: 3-Point flexural strength in [MPa] of samples sintered at different temperatures The powder mixtures ready for shooting have a time limit on their workability if compressed air is used as transfer medium. This can be demonstrated by the flexural strength of the "green" components, which decrease with working time. If nitrogen is employed as process gas, the period for working is extended.

In the text below, the method of the invention is discussed with reference to a further, second example. To produce a metallic component which is suitable for filter applications and consists of a self-supporting structure with large pores and a filter medium with small pores, a procedure is adopted in analogy to the first working example, elucidated above. With the second example, in contrast to the first example, a metallic filter fabric—with a thickness of about 0.2 mm and with a pore size/mesh size of 35 μm, for instance—is inserted, in particular in planar fashion, into the cavity of the tool before the core shooting according to step b).

This is followed by a performance of the method steps described in the first working example: in other words, the steps of filling, core shooting, debinding and sintering are carried out. As the result, a planar metallic fine filter component can be reproduced which is carried by a structure with large pores—pore size approximately 200 μm—and which acquires fine filter qualities by virtue of the "sintered-on" membrane. Alternatively it is also possible to use filter fabrics having different mesh sizes.

The method of the invention is discussed below with reference to a third example. In analogy to the second working example, the possibility also exists of using a "green" intermediate for insertion into the cavity. The system in this case is a metal/ceramic powder layer system comprising a coarse metallic powder layer approximately 200 μm thick and a ceramic powder layer approximately 30 μm thick. The powders are embedded in an organic matrix. In contrast to the first and second working examples, the powder mixture to be applied by core shooting is selected such that there is significant contraction during the thermal treatment. This contraction is set so as to be adapted very well to the contraction behaviour of the green intermediate, and produces, after sintering, a predefined, application-oriented porosity. A component of this kind is suitable for filtering particles of around 10 nm to 20 μm. The corresponding pore size is set via the selection of the ceramic powders in the top layer and by the sintering conditions.

In the text below, the method of the invention is discussed with reference to a fourth example. For robust technical applications where a fracture-sensitive ceramic top layer for filtering, as in the above-described third working example, is not an option, it is also possible to replace this layer by readily reducible oxide particles. As a result, after the reducing of these oxide particles and sintering of the overall shaped body, a metallic top layer, which is tolerant to damage and has a fine porosity, is formed on a robust carrier structure, with adjustable porosity.

In the text below, the method of the invention is discussed with reference to a fifth example:

Referring to the first example, it is conceivable, rather than conventionally produced iron powder or copper powder, to use one or more granules (10 to 500 μm) of starting materials which have been formed by known technological processes—examples include processes known to the skilled person such as spray drying, fluidized bed granulation, pelletizing and cogranulation—from fine, commercial, ceramic or metallic starting materials (0.01 to about 25 μm). This procedure produces shaped bodies which on sintering achieve a high density locally, i.e. in the granules, and which in the interstices, in other words in the pore volumes formed by the contact points of the granule grains, permit a high porosity which can be adjusted via the granule size.

A further difference is that shaped bodies of this kind attain a higher strength after sintering at a given sintering temperature. This is because of the use of particularly sinter-active, fine, starting powders for the granules, and ensures that granule grains form more stable contacts with one another, in zones of contact, than conventional starting powders as in the first example, for instance, where the increase in the sintering temperature produces only a small increase in the strength.

Metallic starting powders in the present context include not only powders composed of pure metals but also those formed from different metals, semi-metals (i.e. semiconducting metals) or metalloids, namely alloys, intermetallic compounds, solid solutions or nanocrystalline and/or amorphous states of material.

The invention claimed is:

1. A method for producing a porous shaped body, comprising:
   providing a mixture of a powder including at least one of a metal, a metal alloy, and a ceramic, with a resin and activator mixture;
   introducing the mixture by core shooting into a cavity formed in a forming tool;
   initiating a chemical reaction in which the powder enters into a bond with resin from the resin and activator mixture by introducing at least one reactive gas into the forming tool to solidify the mixture in the forming tool to give a shaped body;
   heating the shaped body to remove at least one of organic constituents and gases present in the shaped body; and
   sintering the shaped body;
   wherein the powder includes a layer of metallic powder and one of a layer of ceramic powder or a layer of oxide particles on the layer of metallic powder, and the powder is embedded in an organic matrix.

2. A method according to claim 1, wherein the resin and activator mixture has between 0.5 wt % and 5 wt % of a total weight of the mixture.

3. A method according to claim 1, wherein introducing the mixture takes place fluid-dynamically using a pressurized gas.

4. A method according to claim 3, wherein the pressurized gas includes one of compressed air, nitrogen, and argon.

5. A method according to claim 1, wherein the reactive gas includes amide.

6. A method according to claim 1, wherein the shaped body is heated to a temperature between 25° C. and 700° C. in the heating step.

7. A method according to claim 1, wherein heating the shaped body takes place in one of a neutral, an oxidizing, and a reducing atmosphere.

8. A method according to claim 1, wherein the sintering takes place in one of a reducing, a carbonizing, and a neutral atmosphere.

9. A method according to claim 1, wherein, during or after solidifying the mixture, no mechanical pressure is exerted on the shaped body as it forms.

10. A method according to claim 2, wherein introducing the mixture takes place fluid-dynamically using a pressurized gas.

11. A method according to claim 10, wherein the pressurized gas includes one of compressed air, nitrogen, and argon.

12. A method according to claim 1, wherein the powder includes a metallic powder layer 200 μm thick and a ceramic powder layer 30 μm thick.

13. A method comprising:
    providing a mixture of a powder including at least one of a metal, a metal alloy, and a ceramic, with a resin and activator mixture;
    core shooting the mixture into a cavity formed in a forming tool via a pressurized gas;
    initiating a chemical reaction in which the powder enters into a bond with resin from the resin and activator mixture by introducing at least one reactive gas into the forming tool to solidify the mixture in the forming tool to give a shaped body;
    heating the shaped body to a temperature between 25° C. and 700° C. to remove at least one of organic constituents and gases present in the shaped body; and
    sintering the shaped body;
    wherein the powder includes a layer of metallic powder and one of a layer of ceramic powder or a layer of oxide particles on the layer of metallic powder, and the powder is embedded in an organic matrix.

14. A method according to claim 13, wherein the pressurized gas includes one of compressed air, nitrogen, and argon.

15. A method according to claim 13, wherein the reactive gas includes amide.

* * * * *